United States Patent
Kim et al.

(10) Patent No.: US 6,894,603 B2
(45) Date of Patent: May 17, 2005

(54) PACKET COMMUNICATION METHOD OF POWERLINE COMMUNICATION SYSTEM

(75) Inventors: Jin-Tae Kim, Songnam (KR); Dai-Hyun Lim, Kwachon (KR)

(73) Assignee: Xeline Co., Ltd. (KR)

( * ) Notice: Subject to any disclaimer, the term of this patent is extended or adjusted under 35 U.S.C. 154(b) by 474 days.

(21) Appl. No.: 10/205,419

(22) Filed: Jul. 26, 2002

(65) Prior Publication Data

US 2003/0038709 A1 Feb. 27, 2003

(30) Foreign Application Priority Data

Aug. 22, 2001 (KR) ........................................ 2001-50575

(51) Int. Cl.[7] ............................................. H04M 11/04
(52) U.S. Cl. .................. 340/310.01; 375/257
(58) Field of Search ...................... 340/310.01–310.08, 340/2.1, 2.7; 375/257–259

(56) References Cited

U.S. PATENT DOCUMENTS

| | | | | |
|---|---|---|---|---|
| 5,553,072 A | * | 9/1996 | Daggett et al. | ............. 370/447 |
| 2003/0228005 A1 | * | 12/2003 | Melick et al. | ........... 379/93.01 |
| 2004/0071220 A1 | * | 4/2004 | Nakamura et al. | .......... 375/259 |

* cited by examiner

*Primary Examiner*—Jeffery Hofsass
*Assistant Examiner*—George Bugg
(74) *Attorney, Agent, or Firm*—Edell, Shapiro & Finnan, LLC

(57) ABSTRACT packet communication method of a powerline communication system in which a packet communication through a powerline can be made by acquiring a channel according to a priorty order in response to a time delay value set at nodes that have a bigger time delay value than other nodes, wherein the priority is placed by setting a time delay value of a node, which does not take a channel due to the current priority order, at ½ of a maximum value of a prior time delay value range and the priority is also applied to the competition of a channel among other nodes.

6 Claims, 8 Drawing Sheets

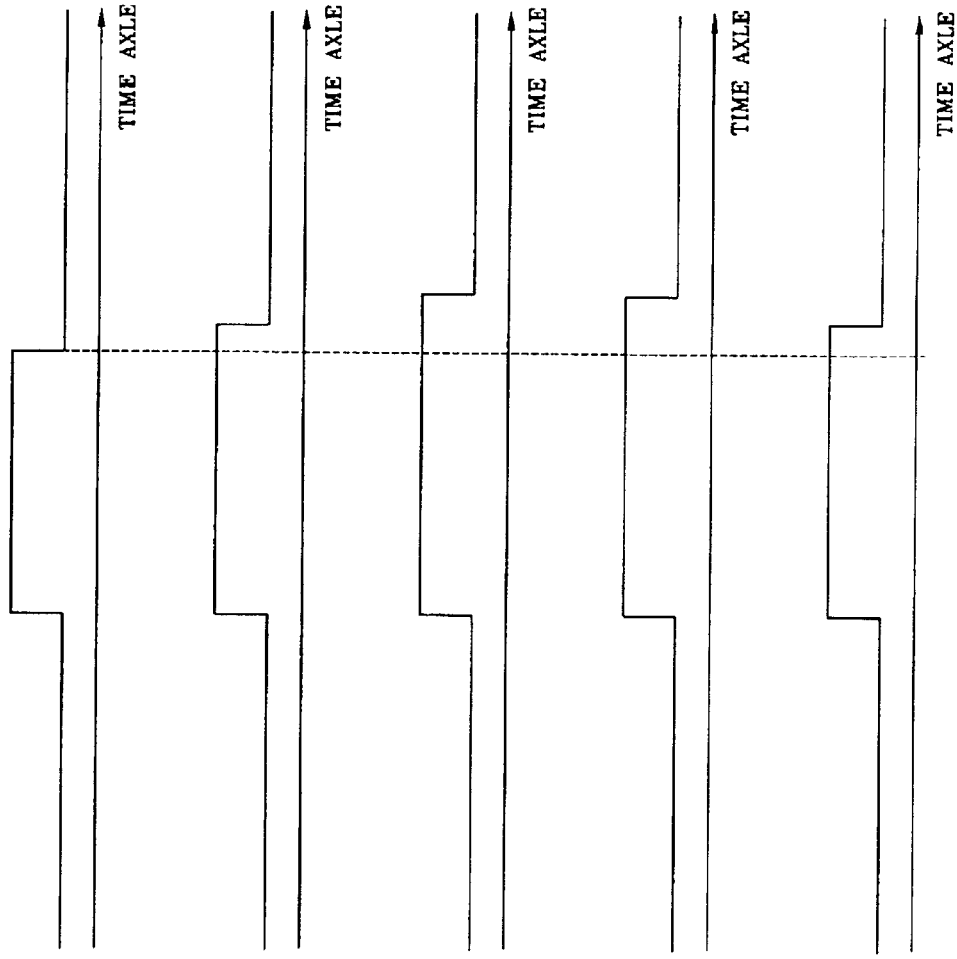

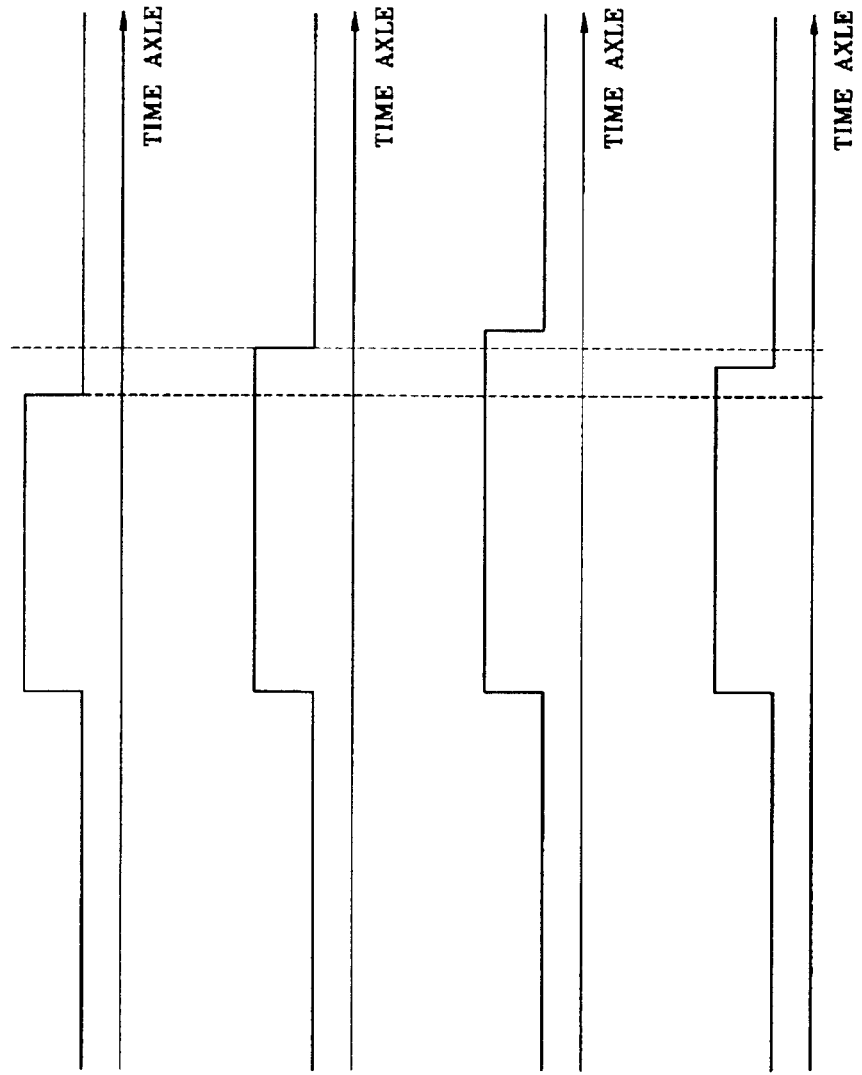

PACKET COMMUNICATION METHOD OF POWERLINE COMMUNICATION SYSTEM

BACKGROUND OF THE INVENTION

1. Field of the Invention

The present invention relates to a powerline communication system, and more particularly to a packet communication method of a powerline communication system.

2. Brief Description of the Prior Art

A description will be made on a packet communication method of a powerline communication system in accordance with the prior art below.

A powerline communication is a communication method in which high frequency communication signals of hundereds of and tens of MHz are sent along to a powerline, through which an alternating current having a frequency of 50~60 Hz is supplied into private houses, but only the high frequency communication signals are received by exclusively used connection equipment. The method as such is a convenient, economical communication network by getting connected to an electric outlet to be used as an external network for an internet connection or local area communication network for an homeLAN without installation of an expensive exclusive powerline or basic network.

In such a powerline, there are many loads (hereinafter referred to as nodes) of home appliances such as TV, VCR, Computer and the like. The powerline has a bus type of a network structure where a plurality of nodes may be in connection with a single medium and it takes a period of time for packet transmission. At this time, there may be a collision phenomenon resulting from the simultaneous transmission of two nodes when the two nodes do not know respective transmission states. In order to solve the aforementioned problem of a multiple connection, there has been disclosed a method named a carrier sense multiple access (CSMA), in which a signal transmission is begun after it is confirmed before the transmission that no channel is in use and no signal is present in the channels. However, this method is not helpful to avoid the collision if two nodes make transmissions at an exactly identical time. The aforementioned phenomenon happens when more than two nodes wait for the time when channels, most of which are occupied by particular nodes, become available for use after completion of communication and all the nodes start transmission at the same time.

In order to prevent a collision, it is necessary to prevent two nodes from waiting together and making a simultaneous transmission. As a method to solve the aforementioned problem, there has been a method in which two nodes waiting for the time to use channels discriminate whether the nodes become available for use and then start a transmission after respective random time delays. At this time, if there is a difference in the time delays, one node firstly uses a channel and the other node starts communication after waiting for the channel to be available again.

However, there have been problems in the aforementioned method of the prior art. Firstly, there may be a collision if the random time delays happen to have an identical value. Secondly, one node is continuously pushed by the other node to start a communication much later than a normal time, so that in most cases communicatin time may exceed its limit to cause disuse of a packet.

To solve the first problem, the number of collisions can be cut down not to make any influence on communication by increasing the range of random time delay values properly to the number of nodes. On the other hand, there has been no particular solution to solve the second problem. What's worse, if three nodes are involved in communication and two nodes are in communication holding most of time slot like a download using a file transfer protocol therebetween, a third node can not get into communication with readiness. The phenomenon described above may be solved when a priority is put to specific nodes. On the contrary, in the worst case that a node having a lower priority is at a disadvantage, it can not be a solution because there may be no communication at all.

SUMMARY OF THE INVENTION

The present invention is disclosed to solve the aforementioned problem and it is an object of the present invention to provide a packet communication method of a powerline communication system, in which, in case of a packet communication between nodes through a powerline, a packet communication can be made by acquiring nodes according to a priorty order set in nodes pushed behind in competition of a channel, wherein the priority is placed by setting a current time delay value range of a node, which does not take a channel due to the current priority order, at a predetermined range, smaller than a maximum value of a prior time delay value range and then setting a random time delay value within the current time delay value range.

In order to accomplish the aforementioned object of the present invention, there is provided a packet communication method of a powerline communication system in which first and second nodes are performing a packet communication while the first through n nodes are in connection with a powerline, are performing a packet communication, the method comprising the steps of:

(a) performing a packet communication with the first node by letting a channel acquired by either the third or fourth node whose virtual signal resulting from the random time delay value is shorter in case third and fourth nodes make an attempt to acquire a channel for a packet communication with the first node, if a signal is not detected in the powerline when a signal detection result of the powerline is checked according to a channel signal resulting from a signal detection of the powerline and a virtual signal resulting from the delay of the channel signal as much as a random time delay value within an initial time delay value range;

(b) performing a packet communication with the first node by letting a channel acquired by either the node that does not acquire a channel or the fifth node, whose virtual signal delayed as much as the random time delay value is shorter in case a node, which has not acquired a channel in step (a), and an additional fifth node simultaneously make an attempt for a packet communication with the first node, according to a channel signal resulting from the signal detection of a powerline after setting a random time delay value of a predetermined range when the node that does not acquire a channel sets a time delay value range at a predetermined one, smaller than a maximum of a prior time delay value and a virtual signal resulting from the delay of the channel signal as much as the set random time delay value, and according to a channel signal resulting from the signal detection of the powerline in the fifth node and a virtual signal resulting from the delay of the channel signal as much as the random time delay value of the initial time delay value range, if a signal is not detected in the powerline when a signal detection result of the powerline is checked; and (c) performing a packet communication with the first node by acquiring a channel if a signal is not detected in the powerline as a result of the signal detection of the powerline according to a channel signal resulting from the signal detection of a powerline after setting a random time delay value of a predetermined range when the node that does not acquire a channel at step (b) sets a time delay value range at a predetermined one, smaller than a maximum of a prior time delay value, and a virtual signal resulting from the delay of the channel signal as much as the set random time delay value.

At this time, the predetermined range is set at one of the following values, that is, $1/10$, $1/9$, $1/8$, $1/7$, $1/6$, $1/5$, $1/4$, $1/3$ or $1/2$ of the maximum value range of the prior time delay value.

At step (b), (c), when the packet communication is completed, the time delay value range will be returned to the maximum of the initial time delay value range.

In order to accomplish the aforementioned object of the present invention, there is provided another aspect of a packet communication method of a powerline communication system in which first and second nodes out of all nodes 1 through n that are in connection with a powerline are performing a packet communication, the method comprising the steps of:

(a) performing a packet communication with the first node by letting a channel acquired by either the third or fourth node whose virtual signal resulting from the random time delay value is shorter in case third and fourth nodes make an attempt to acquire a channel for a packet communication with the first node, if a signal is not detected in the powerline when a signal detection result of the powerline is checked according to a channel signal resulting from a signal detection of the powerline and a virtual signal resulting from the delay of the channel signal as much as a random time delay value within an initial time delay value range;

(b) performing a packet communication with the first node by letting a channel acquired by either the node that does not acquire a channel or the other plurality of nodes, whose virtual signal delayed as much as the random time delay value is shorter in case a node, which has not acquire a channel in step (a), and an additional plurality of nodes simultaneously make an attempt for a packet communication with the first node, according to a channel signal resulting from the signal detection of a powerline after setting a random time delay value of a predetermined range when the node that does not acquire a channel sets a time delay value range at a predetermined one, smaller than a maximum of a prior time delay value and a virtual signal resulting from the delay of the channel signal as much as the set random time delay value, and according to a channel signal resulting from the signal detection of the powerline in each of the plurality of nodes and a virtual signal resulting from the delay of the channel signal as much as the random time delay value of the initial time delay value range, if a signal is not detected in the powerline when a signal detection result of the powerline is checked;

(c) performing a packet communication with the first node by acquiring a channel after setting a random time delay value of a predetermined range when the node that does not acquire a channel at step (a) or any of the other nodes that do not acquire a channel at step (b) sets a time delay value range at a predetermined one, smaller than a maximum of a prior time delay value, if a signal is not detected in the powerline as a result of the signal detection of the powerline according to a channel signal resulting from the signal detection of a powerline and a virtual signal resulting from the delay of the channel signal as much as the set random time delay value; and (d) repeating step (c) until the packet communication with the first node is completed in the node that does not acquire a channel at step (a) or the additional plurality of nodes that do not acquire a channel.

At this time, the predetermined range is set at one of the following values, that is, $1/10$, $1/9$, $1/8$, $1/7$, $1/6$, $1/5$, $1/4$, $1/3$ or $1/2$ of the maximum value range of the prior time delay value.

At step (b), (c), when the packet communication is completed, the time delay value range will be returned to the maximum of the initial time delay value range.

BRIEF DESCRIPTION OF THE DRAWINGS

Objects and aspects of the invention will become apparent from the following description of preferred embodiments with reference to the accompanying drawings in which:

FIG. 3 is a schematic drawing for illustrating an actual length of a packet and a virtual signal of a virtual signal generator between nodes 3 and 4 in packet communication between nodes 1 and 2 shown in FIG. 2;

FIG. 4 is a schematic drawing for illustrating an actual length of a packet and a virtual signal of a virtual signal generator between nodes 4 and 5 in packet communication between nodes 3 and 1 shown in FIG. 2.

DETAILED DESCRIPTION OF THE INVENTION

Hereinafter, other objects, features and advantages of the present invention will be apparently described according to embodiments with reference to accompanying drawings.

Figure 1:
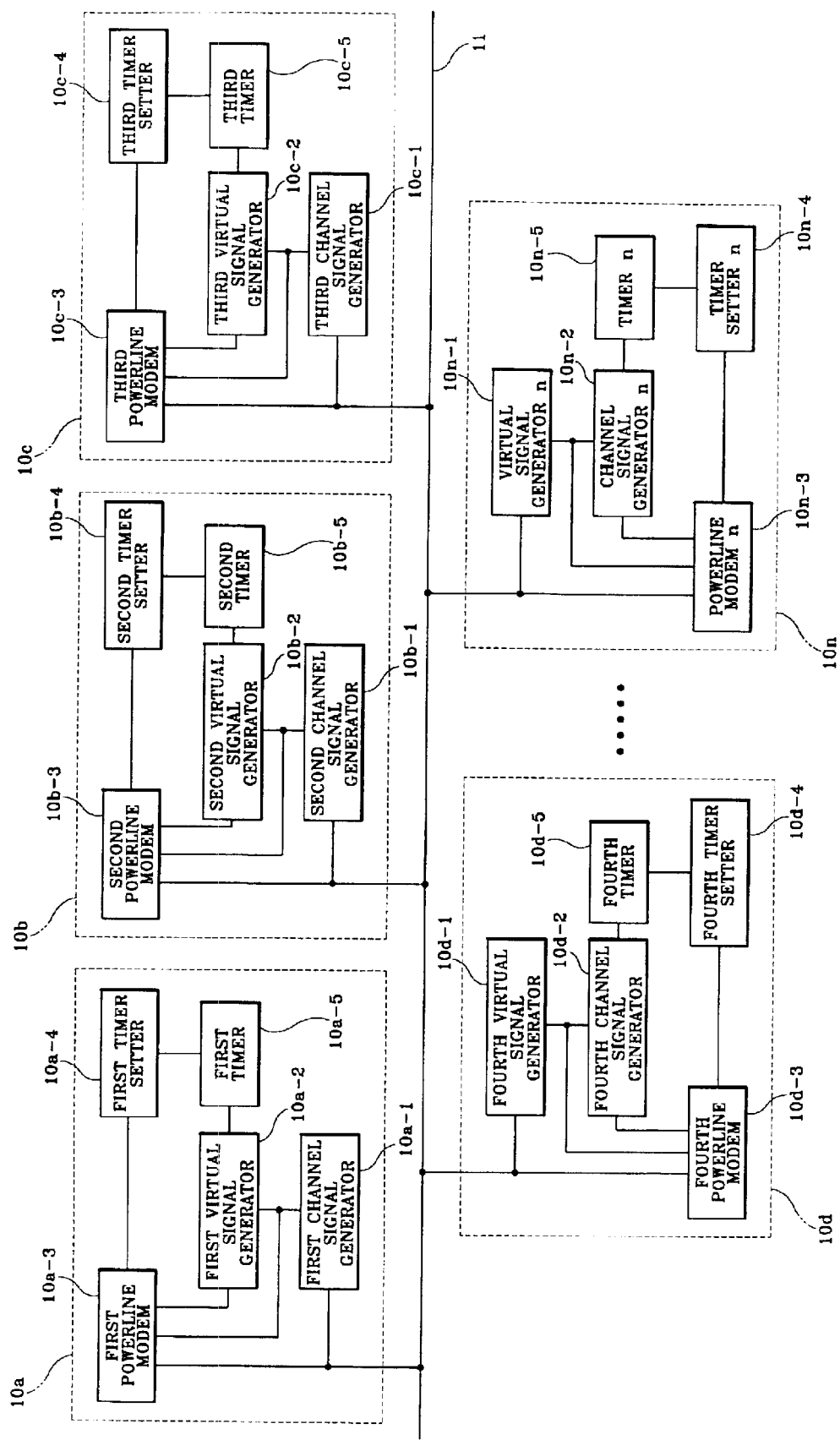
FIG. 1 illustrates a powerline communication system in accordance with an embodiment of the present invention.
Figure 2A:
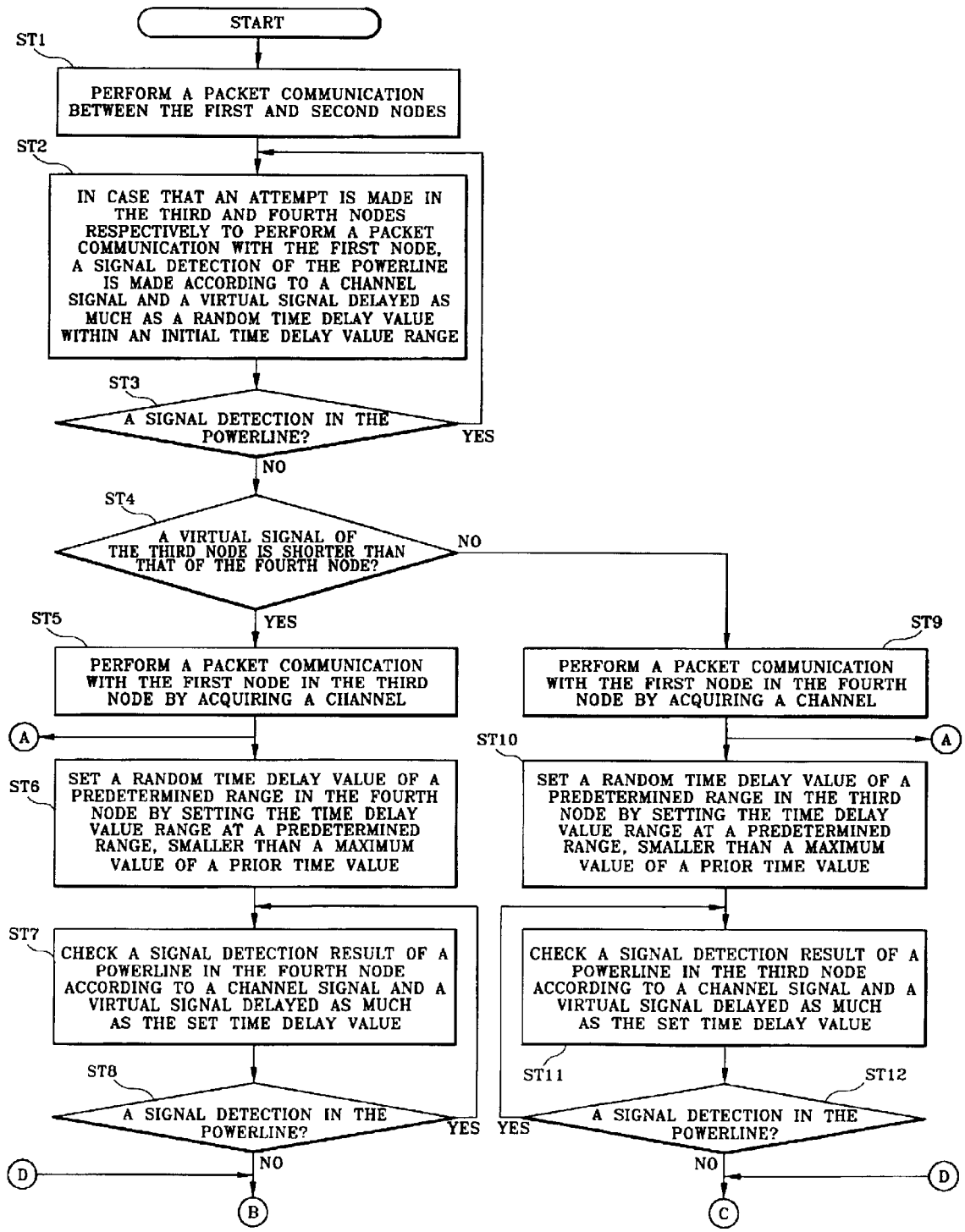
FIGS. 2a through 2d are flowcharts for illustrating a packet communication method of a powerline communication system in accordance with the present invention.
Figure 2B:
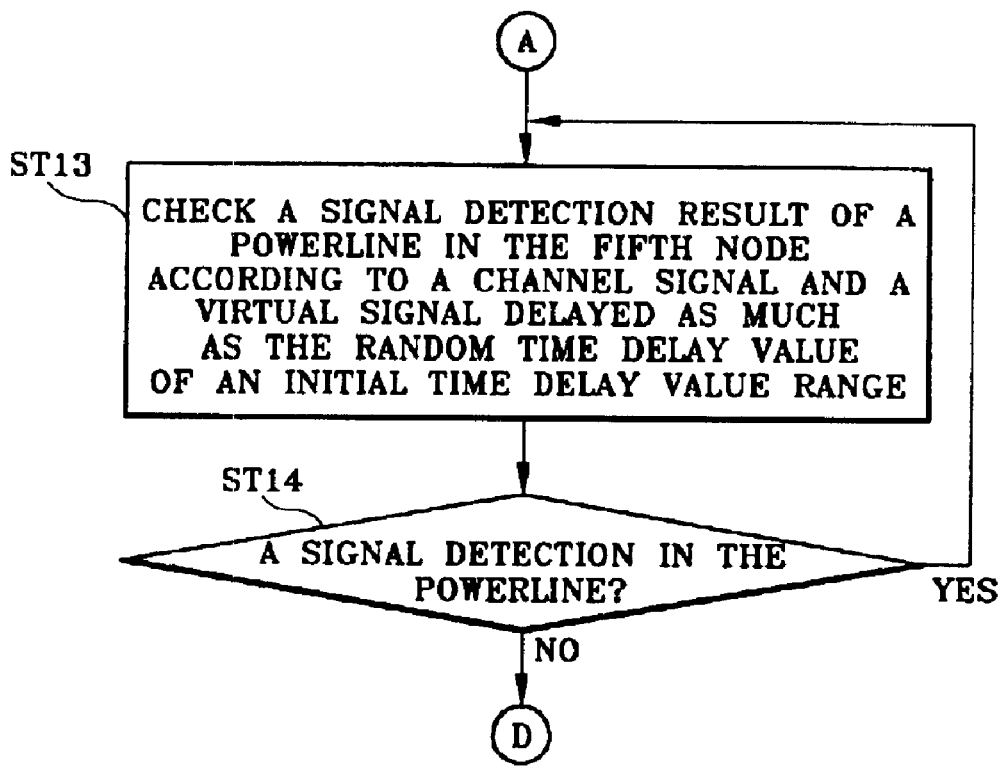
Figure 2C:
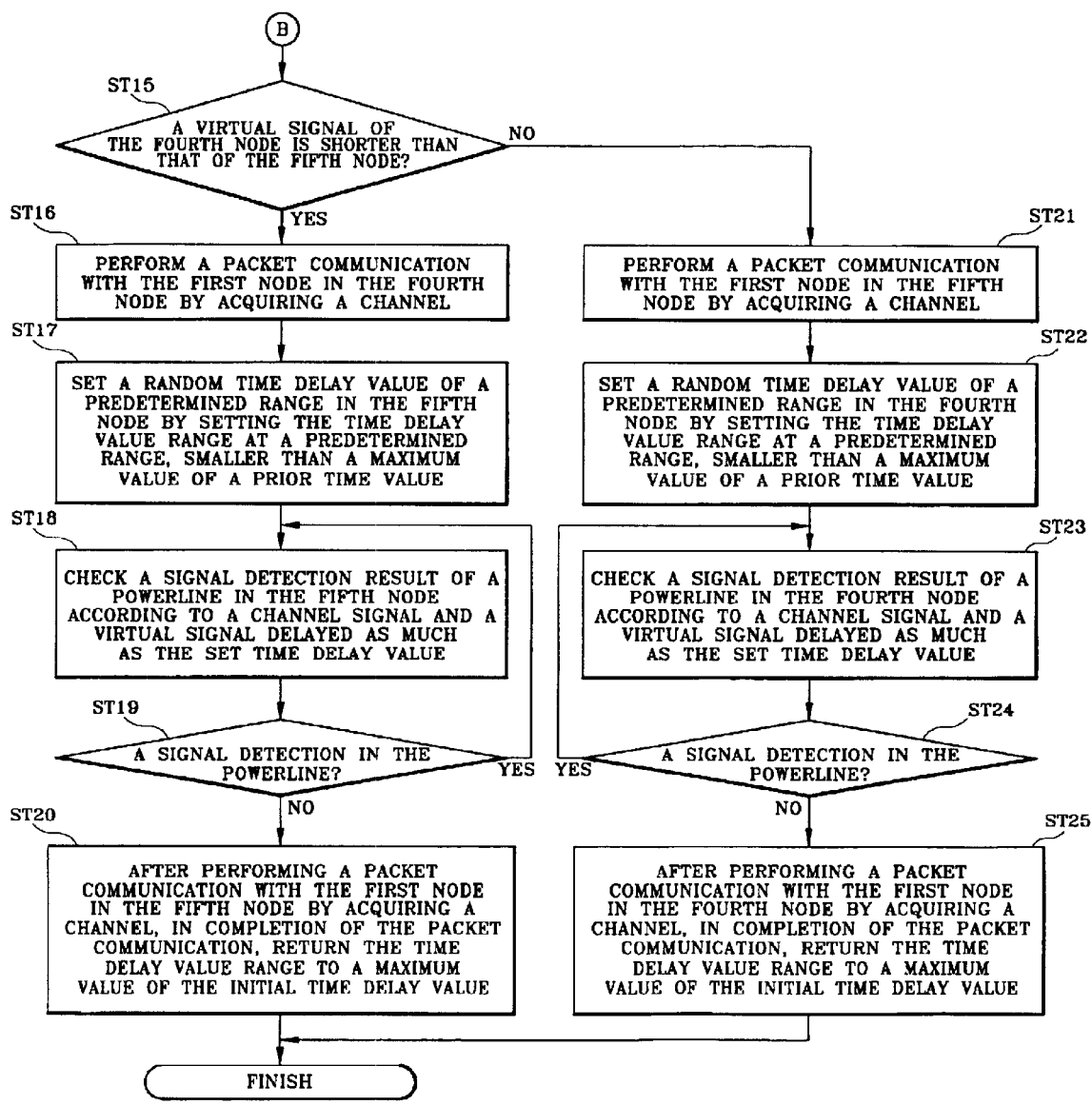
Figure 2D:
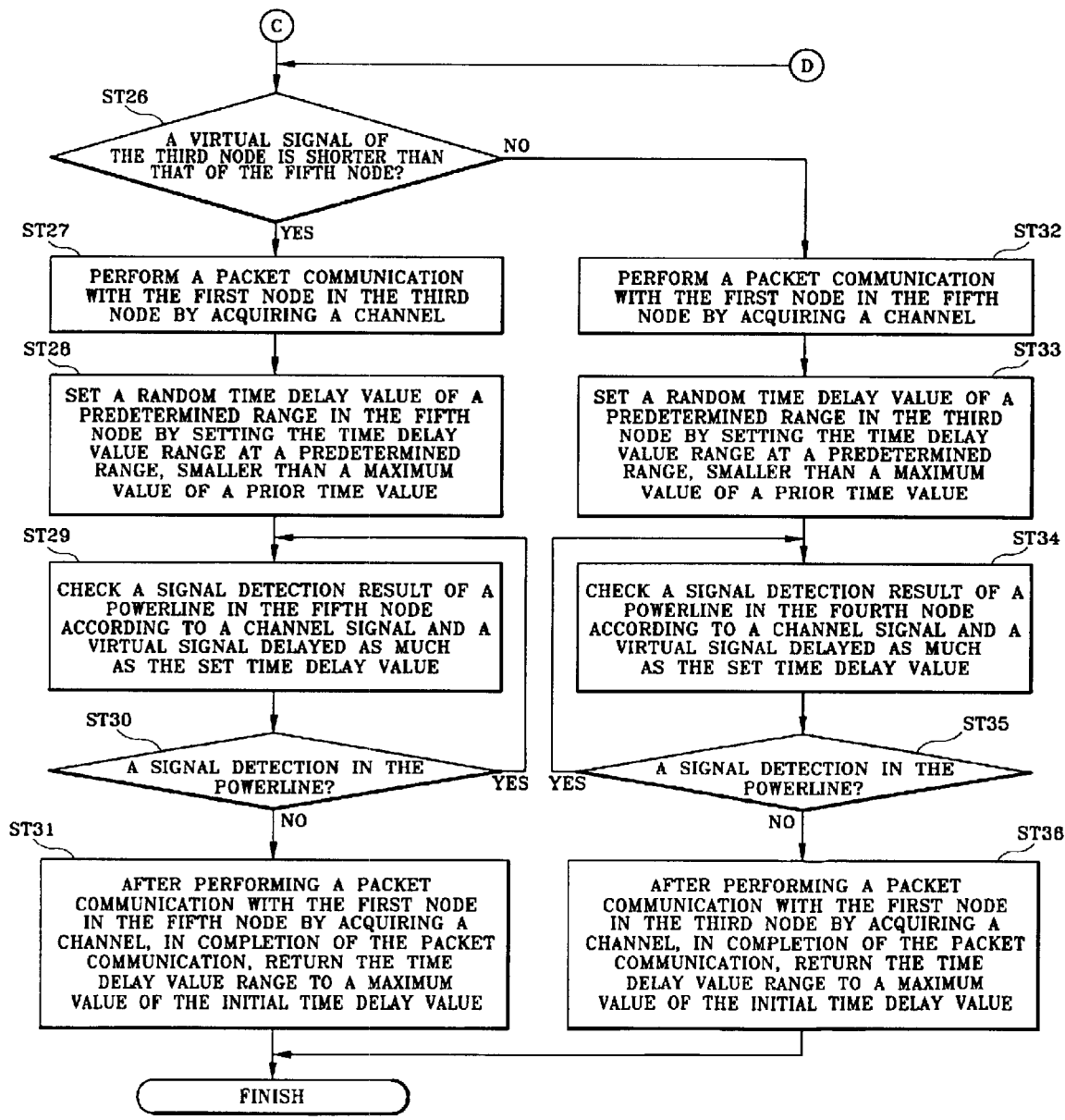

FIG. 1 illustrates a packet communication method of a powerline communication system in accordance with an embodiment of the present invention. The system is constructed with first through n nodes (10a~10n) connected through a power line 11. At this time, the first through n nodes (10a~10n) are further include first through 1 channel signal generators (10a-1~10n-1), first through n virtual signal generators (10a-2~10n-2, first through n powerline modems (10a-3~10n-3), first through n timer setters (10a-4~10n-4) and first through n timers (10a-5~10n-5).

At this time, the first through n channel signal generators (10a-1~10n-1) check signal detection results of the powerline 11 to output the resultant channel signals to the first through n virtual signal generators and powerline modems (10a-2~10n-2), (10a-3~10n-3).

Besides, the first through n virtual signal generators (10a-2~10n-2) generate virtual signals as much as a time delay value preset at the first through n timers (10a-5~10n-5) according to a channel signal output from the first through n channel signal generators (10a-1 10n-1).

Furthermore, the first through n powerline modems (10a-3~10n-3) perform a packet communication through the powerline 11 according to channel signals output from the first through n channel signal generators (10a-1~10n-1) and virtual signals output from the first through n virtual signal generators (10a-2~10n-2) or output signals to set time delay values for the first through n timers (10a-5~10n-5).

Moreover, the first through n timer setters (10a-4~10n-4) set a current time delay value range of the first through n timers (10a-5~10n-5) at a predetermined one, smaller than a maximum of a prior time delay value range and further set the first through n timers (10a-5~10n-5) at a random time delay value within the maximum value range. The predetermined range is set at one of the following values, that is, $1/10, 1/9, 1/8, 1/7, 1/6, 1/5, 1/4, 1/3$ or $1/2$ of the maximum value range of the prior time delay value.

The first through n timers (10a-1~10n-1) are respectively initiated by forward or backward counting the time delay value set at the first through n timer setters (10a-4~10n-4) between 0~n.

Figure 5:
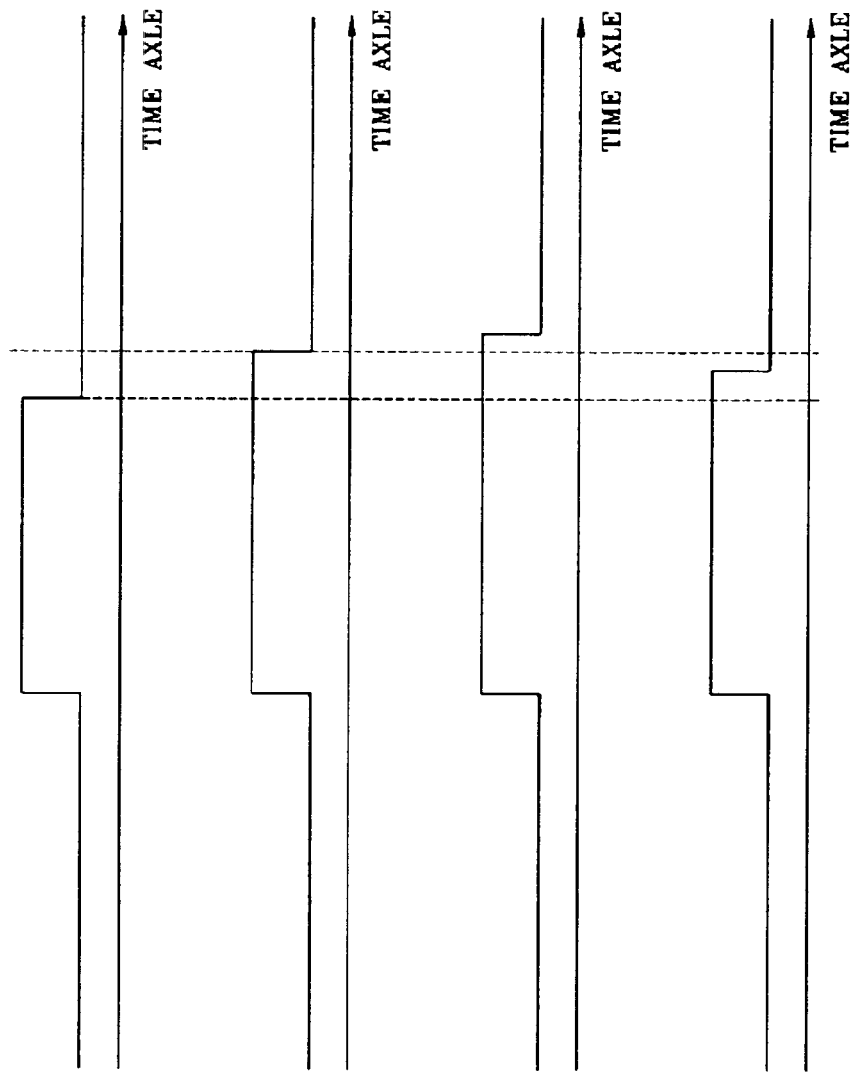
FIG. 5 is a schematic drawing for illustrating an actual length of a packet and a virtual signal of a virtual signal generator between nodes 3 and 5 in packet communication between nodes 4 and 1 shown in FIG. 2.

FIGS. 2a through 2d illustrate flowcharts for illustrating an embodiment of a packet communication method of a powerline communication system in accordance with the present invention. FIG. 3 is an embodiment for illustrating an actual length of a packet and a virtual signal of a virtual signal generator between nodes 3 and 4 in packet communication between nodes 1 and 2 shown in FIG. 2. FIG. 4 is an embodiment for illustrating an actual length of a packet and a virtual signal of a virtual signal generator between nodes 4 and 5 in packet communication between nodes 3 and 1 shown in FIG. 2. FIG. 5 an embodiment for illustrating an actual length of a packet and a virtual signal of a virtual signal generator between nodes 3 and 5 in packet communication between nodes 4 and 1 shown in FIG. 2.

Operations of the packet communication method of the powerline communication system thus constructed according to the present invention will be described in detail with reference to accompanying drawings.

The third and fourth nodes 10c, 10d make an attempt to acquire a channel for communication with the first node 10a when a packet communication is made between the first and second nodes 10a, 10b while the first through n nodes 10a~10n) are in connection through the powerline 11.

First of all, the third channel signal generator 10c-1 of the third node 10c checks a signal generation result of the powerline 11 to transmit the resultant channel signal to the third virtual signal generator 10c-2 and the third powerline modem 10c-3. The fourth channel signal generator 10d-1 of the fourth node 10d checks the signal generation result of the power line 11 to transmit the resultant channel signal to the fourth signal generator 10d-2 and the fourth powerline modem 10d-3.

Then, the third virtual signal generator 10c-2 generates a virtual signal delayed as much as a random time delay value set within an initial time delay value range at the third timer 10c-5 according to a channel signal transmitted from the third channel signal generator 10c-1. In addition, the fourth virtual signal generator 10d-2a virtual signal delayed as much as a random time delay value set within an initial time delay value range at the fourth timer 10d-5 according to a channel signal transmitted from the fourth channel signal generator 10d-1 (ST1).

Accordingly, the third powerline modem 10c of the third node 10c checks the signal detection result of the powerline 11 according to the channel signal transmitted from the third channel signal generator 10c-1 and the virtual signal generated from the third virtual signal generator 10c-2. The fourth powerline modem 10d of the fourth node 10d checks a signal detection result of the powerline 11 according to the channel signal transmitted from the fourth channel signal generator 10d-1 and the virtual signal generated from the fourth signal generator 10d-2 (ST2).

If a signal is detected in the powerline 11 as a result of steps ST1, ST2 is repeated at the third powerline modem 10c-3 of the third node 10c and the fourth powerline modem 10d-3 of the fourth node 10d. On the contrary, if a signal is not detected in the powerline 11 as a result of ST2, one of the two nodes, the third or fourth node, whose virtual signal is shorter is acquired by checking the length of the third or fourth virtual signals respectively generated at the third and fourth virtual signal generators (10c-2, 10d-2) to thereby perform a packet communication with the first node 10a (ST3). For instance, in case of a packet communication between the first and second nodes 10a, 10b, with reference to the actual length of the packet, as shown in FIG. 3, if the virtual signal generated from the third virtual signal generator 10c-2 is shorter than the one generated from the fourth virtual signal generator 10d-2, the third node 10c acquires the channel to perform a packet communication with the first node 10a through the third powerline modem 10c-3 (ST4, ST5).

Then, the fourth powerline modem 10d-3 of the fourth node 10d that failed to acquire a channel sets the time delay value range at a predetermined one, shorter than the maximum of a prior time delay value to transmit a control signal for setting a random time delay value within a predetermined range to the fourth timer setter (10d-4).

Accordingly, the fourth time setter 10d-4 sets the time delay value range of the fourth timer 10d-5 at a predetermined one, smaller than the maximum of the prior time delay value range according to a control signal transmitted from the fourth powerline modem 10d-3 to set a random time delay value within a predetermined range (ST-6). The fourth timer (10d-5) further counts the time delay value set at the fourth timer setter (10d-4) forward or backward from 0 through n for initialization. The predetermined range is set at one of the following values, that is, $1/10, 1/9, 1/8, 1/7, 1/6, 1/5, 1/4, 1/3$ or $1/2$ of the maximum value range of the prior time delay value.

Then, the fourth virtual signal generator 10d-2 generates a virtual signal delayed as much as the time delay value counted at the fourth timer 10d-5, and the fourth powerline modem 10d-3 checks a signal detection result of the powerline 11 according to the channel signal transmitted from the fourth channel signal generator 10d-1 and the virtual signal generated from the fourth virtual signal generator 10d-2 (ST7).

At the same time, if an attempt is made by the fifth node 10e to acquire a channel for a packet communication with the first node 10a, the fifth channel signal generator 10e-1 of the fifth node 10e checks the signal detection result of the powerline 11 to transmit the resultant channel signal to the fifth virtual signal generator 10e-2 and the fifth powerline modem 10e-3.

Then, the fifth virtual signal generator 10e-2 generates a virtual signal delayed as much as a random time delay value set within an initial time delay value range to the fifth timer 10e-5 according to a channel signal transmitted from the fifth channel signal generator 10e-1.

Accordingly, the fifth powerline modem 10e of the fifth node checks a signal detection result of the powerline 11 according to the channel signal transmitted from the fifth channel signal generator 10e-1 and the virtual signal generated from the fifth virtual signal generator 10e-2 (ST13).

If a signal is detected as a signal detection result at step ST7, ST7 is repeated at the fourth powerline modem 10d-3 of the fourth node 10*d*. If a signal is detected in the powerline 11 as a signal detection result of step ST13, ST13 is repeated at the fifth powerline modem 10*e*-3 of the fifth node 10*e* (ST8, ST14).

Moreover, if a signal is not detected in the powerline 11 as a result of steps ST7, ST13, the length of the virtual signals respectively generated from the fourth and fifth virtual signal generators (10*d*-2, 10*e*-2) of the fourth and fifth nodes (10*d*, 10*e*) are compared to determine which node has a shorter virtual signal. Thus, the node having a shorter virtual signal acquires a channel to perform a packet communication with the first node 10*a* (ST8). For instance, as shown in FIG. 4, the virtual signal generated from the fourth virtual signal generator 10*d*-2 of the fourth node 10*d* is shorter than that generated from the fifth virtual signal generator 10*e*-2 of the fifth node 10*e*, the fourth node 10*d* acquires a channel to perform a packet communication with the first node 10*a* through the fourth powerline modem 10*d*-3 (ST15, ST16).

Then, the fifth powerline modem 10*e*-3 of the fifth node 10*e* that does not acquire a channel sets the time delay value range at a predetermined one, smaller than a maximum of the prior time delay value to transmit to the fifth timer setter (10*e*-4) a control signal to set a random time delay value within a predetermined range.

Accordingly, the fifth timer setter (10*e*-4) sets a random time delay value within a predetermined range by setting the time delay value range of the fifth timer (10*e*-5) at a predetermined one, smaller than a maximum of the prior time delay value according to the control signal transmitted from the fifth powerline modem (10*e*-3) (ST17). The fifth timer (10*e*-5) counts forward or backward the time delay value set at the fifth timer setter (10*e*-4) from 0 through n for initialization. The predetermined range is set at one of the following values, that is, $\frac{1}{10}$, $\frac{1}{9}$, $\frac{1}{8}$, $\frac{1}{7}$, $\frac{1}{6}$, $\frac{1}{5}$, $\frac{1}{4}$, $\frac{1}{3}$ or $\frac{1}{2}$ of the maximum value range of the prior time delay value.

Then, the fifth virtual signal generator 10*e*-2 generates a virtual signal delayed as much as the time delay value counted at the fifth timer 10*e*-5, and the fifth powerline modem 10*e*-3 checks a signal detection result of the powerline 11 according to the channel signal transmitted from the fifth channel signal generator 10*e*-1 and the virtual signal generated from the fifth virtual signal generator 10*e*-2 (ST18).

If a signal is detected in the powerline 11 as a signal detection result at step ST18, ST18 is repeated at the fifth powerline modem 10*e*-3 of the fifth node 10*e*. On the contrary, if a signal is not detected in the powerline 11, the fifth node (10*e*) acquires a channel to perform a packet communication with the first node 10*a* through the fifth powerline modem (10*e*-3). When the packet communication is completed, the time delay value range will be returned to the maximum of the initial time delay value range (ST19, ST20).

As a result of the detection at ST15, in case of a packet communication between the third and first nodes 10*c*, 10*a*, with reference to the actual length of the packet, as shown in FIG. 4, if the virtual signal generated from the fifth virtual signal generator 10*e*-2 of the fifth node (10*e*) is shorter than the one generated from the fourth virtual signal generator (10*d*-2) of the fourth node (10*d*), the fifth node 10*e* acquires a channel to perform a packet communication with the first node 10*a* through the fifth powerline modem 10*e*-3 (ST21).

Then, the fourth powerline modem 10*d*-3 of the fourth node 10*d* that failed to acquire a channel sets the time delay value range at a predetermined one, shorter than the maximum of a prior time delay value to transmit a control signal for setting a random time delay value within a predetermined range to the fourth timer setter (10*d*-4).

Accordingly, the fourth time setter 10*d*-4 sets the time delay value range of the fourth timer 10*d*-5 at a predetermined one, smaller than the maximum of the prior time delay value range according to the control signal transmitted from the fourth powerline modem 10*d*-3 to thereby set a random time delay value within a predetermined range (ST22). The fourth timer (10*d*-5) further counts the time delay value set at the fourth timer setter (10*d*-4) forward or backward from 0 through n for initialization. The predetermined range is set at one of the following values, that is, $\frac{1}{10}$, $\frac{1}{9}$, $\frac{1}{8}$, $\frac{1}{7}$, $\frac{1}{6}$, $\frac{1}{5}$, $\frac{1}{4}$, $\frac{1}{3}$ or $\frac{1}{2}$ of the maximum value range of the prior time delay value.

Then, the fourth virtual signal generator 10*d*-2 generates a virtual signal delayed as much as the time delay value counted at the fourth timer 10*d*-5, and the fourth powerline modem 10*d*-3 checks a signal detection result of the powerline 11 according to the channel signal transmitted from the fourth channel signal generator 10*d*-1 and the virtual signal generated from the fourth virtual signal generator 10*d*-2 (ST23).

If a signal is detected in the powerline 11 as a signal detection result at step ST23, ST23 is repeated at the fourth powerline modem 10*d*-3 of the fourth node 10*d*. On the contrary, if a signal is not detected in the powerline 11, the fourth node (10*d*) acquires a channel to perform a packet communication with the first node 10*a* through the fourth powerline modem (10*d*-3). When the packet communication is completed, the time delay value range will be returned to the maximum of the initial time delay value range (ST24, ST25).

As a result of the detection at ST4, in case of a packet communication between the first and second nodes 10*a*, 10*b*, with reference to the actual length of the packet, as shown in FIG. 3, if the virtual signal generated from the fourth virtual signal generator 10*d*-2 is shorter than the one generated from the third virtual signal generator (10*c*-2), the fourth node 10*d* acquires a channel to perform a packet communication with the first node 10*a* through the fourth powerline modem 10*d*-3 (ST9).

Then, the third powerline modem 10*c*-3 of the third node 10*c* that failed to acquire a channel sets the time delay value range at a predetermined one, shorter than the maximum of a prior time delay value to transmit a control signal for setting a random time delay value within a predetermined range to the third timer setter (10*c*-4).

Accordingly, the third time setter 10*c*-4 sets the time delay value range of the third timer 10*c*-5 at a predetermined one, smaller than the maximum of the prior time delay value range according to the control signal transmitted from the third powerline modem 10*c*-3 to thereby set a random time delay value within a predetermined range (ST10). The third timer (10*c*-5) further counts the time delay value set at the third timer setter (10*c*-4) forward or backward from 0 through n for initialization. The predetermined range is set at one of the following values, that is, $\frac{1}{10}$, $\frac{1}{9}$, $\frac{1}{8}$, $\frac{1}{7}$, $\frac{1}{6}$, $\frac{1}{5}$, $\frac{1}{4}$, $\frac{1}{3}$ or $\frac{1}{2}$ of the maximum value range of the prior time delay value.

Then, the third virtual signal generator 10*c*-2 generates a virtual signal delayed as much as the time delay value counted at the third timer 10*c*-5, and the third powerline modem 10*c*-3 checks a signal detection result of the powerline 11 according to the channel signal transmitted from the third channel signal generator 10*c*-1 and the virtual signal generated from the third virtual signal generator 10*c*-2 (ST11).

At the same time, if an attempt is made by the fifth node 10e to acquire a channel for a packet communication with the first node 10a, the fifth channel signal generator 10e-1 of the fifth node 10e checks a signal detection result of the powerline 11 to transmit the resultant channel signal to the fifth virtual signal generator 10e-2 and the fifth powerline modem 10e-3.

Then, the fifth virtual signal generator 10e-2 generates a virtual signal delayed as much as a random time delay value set within an initial time delay value range to the fifth timer 10e-5 according to a channel signal transmitted from the fifth channel signal generator 10e-1.

Accordingly, the fifth powerline modem (10e-3) of the fifth node (10e) checks a signal detection result of the powerline 11 according to the channel signal transmitted from the fifth channel signal generator 10e-1 and the virtual signal generated from the fifth virtual signal generator 10e-2 (ST13).

If a signal is detected as a signal detection result at step ST11, ST11 is repeated at the third powerline modem 10c-3 of the third node 10c. If a signal is detected in the powerline 11 as a signal detection result of step ST13, ST13 is repeated at the fifth powerline modem 10e-3 of the fifth node 10e (ST12, ST14).

Moreover, if a signal is not detected in the powerline 11 as a result of steps ST11, ST13, the length of the virtual signals respectively generated from the third and fifth virtual signal generators (10c-2, 10e-2) of the third and fifth nodes (10c, 10e) are compared to determine which node has a shorter virtual signal. Thus, the node having a shorter virtual signal acquires a channel to perform a packet communication with the first node 10a (ST8). For instance, as shown in FIG. 5, the virtual signal generated from the third virtual signal generator 10c-2 of the third node 10c is shorter than that generated from the fifth virtual signal generator 10e-2 of the fifth node 10e, the third node 10c acquires a channel to perform a packet communication with the first node 10a through the third powerline modem 10c-3 (ST26, ST27).

Then, the fifth powerline modem 10e-3 of the fifth node 10e that failed to acquire a channel sets the time delay value range at a predetermined one, shorter than the maximum of a prior time delay value to transmit a control signal for setting a random time delay value within a predetermined range to the fifth timer setter (10e-4).

Accordingly, the fifth time setter 10e-4 sets the time delay value range of the fifth timer 10c-5 at a predetermined one, smaller than the maximum of the prior time delay value range according to the control signal transmitted from the fifth powerline modem 10e-3 to thereby set a random time delay value within a predetermined range (ST28). The fifth timer (10e-5) further counts the time delay value set at the fifth timer setter (10e-4) forward or backward from 0 through n for initialization. The predetermined range is set at one of the following values, that is, $\frac{1}{10}$, $\frac{1}{9}$, $\frac{1}{8}$, $\frac{1}{7}$, $\frac{1}{6}$, $\frac{1}{5}$, $\frac{1}{4}$, $\frac{1}{3}$ or $\frac{1}{2}$ of the maximum value range of the prior time delay value.

Then, the fifth virtual signal generator 10e-2 generates a virtual signal delayed as much as the time delay value counted at the fifth timer 10e-5, and the fifth powerline modem 10e-3 checks a signal detection result of the powerline 11 according to the channel signal transmitted from the fifth channel signal generator 10e-1 and the virtual signal generated from the fifth virtual signal generator 10e-2 (ST29).

If a signal is detected as a signal detection result at step ST29, ST29 is repeated at the fifth powerline modem 10e-3 of the fifth node 10e. If a signal is detected in the powerline 11, the fifth node 10e acquires a channel to perform a packet communication with the first node 10a through the fifth powerline modem 10e-3. When the packet communication is completed, the time delay value range will be returned to a maximum of the initial time delay value range (ST30, ST31).

As a result of the detection at ST26, in case of a packet communication between the third and first nodes 10c, 10a, with reference to the actual length of the packet, as shown in FIG. 5, if the virtual signal generated from the fifth virtual signal generator 10e-2 of the fifth node (10e) is shorter than the one generated from the third virtual signal generator (10c-2) of the third node (10c), the fifth node 10e acquires a channel to perform a packet communication with the first node 10a through the fifth powerline modem 10e-3 (ST32).

Then, the third powerline modem 10c-3 of the third node 10c that failed to acquire a channel sets the time delay value range at a predetermined one, shorter than the maximum of a prior time delay value to transmit a control signal for setting a random time delay value within a predetermined range to the third timer setter (10c-4).

Accordingly, the third time setter 10c-4 sets the time delay value range of the third timer 10c-5 at a predetermined one, smaller than the maximum of the prior time delay value range according to the control signal transmitted from the third powerline modem 10c-3 to thereby set a random time delay value within a predetermined range (ST33). The third timer (10c-5) further counts the time delay value set at the third timer setter (10c-4) forward or backward from 0 through n for initialization. The predetermined range is set at one of the following values, that is, $\frac{1}{10}$, $\frac{1}{9}$, $\frac{1}{8}$, $\frac{1}{7}$, $\frac{1}{6}$, $\frac{1}{5}$, $\frac{1}{4}$, $\frac{1}{3}$ or $\frac{1}{2}$ of the maximum value range of the prior time delay value.

Then, the third virtual signal generator 10c-2 generates a virtual signal delayed as much as the time delay value counted at the third timer 10c-5, and the third powerline modem 10c-3 checks a signal detection result of the powerline 11 according to the channel signal transmitted from the third channel signal generator 10c-1 and the virtual signal generated from the third virtual signal generator 10c-2 (ST34).

If a signal is detected as a signal detection result at ST34, ST34 is repeated at the third powerline modem 10c-3 of the third node 10c. If a signal is detected in the powerline 11, the third node 10c acquires a channel to perform a packet communication with the first node 10a through the third powerline modem 10c-3. When the packet communication is completed, the time delay value will be returned to a maximum of the initial time delay value range (ST35, ST36).

Also, for a packet communication between the third and first nodes or between the fourth and first nodes, or for a simultaneous packet communication between the fourth or third node and a plurality of nodes, it is possible to apply the present invention.

As described above, there is an advantage in the present invention in the packet communication method of a powerline communication system in that, in case of a packet communication between nodes through a powerline, a packet communication can be made by acquiring nodes according to a priorty order set in nodes pushed behind in competition of a channel, wherein the priority is placed by setting a current time delay value range of a node, which does not take a channel due to the current priority order, at a predetermined range, smaller than a maximum value of a prior time delay value range and then setting a random time delay value within the current time delay value range.

Having described about the preferred embodiment and operational effects of the present invention, it is to be understood that the invention is not limited to those precise embodiments, and that various changes and modifications may be effected therein by one skilled in the art without departing from the scope or spirit of the invention as defined in the appended claims.

What is claimed is:

1. A packet communication method of a powerline communication system in which first and second nodes out of all nodes 1 through n that are in connection with a powerline are performing a packet communication, the method comprising the steps of:

(a) performing a packet communication with the first node by letting a channel acquired by either the third or fourth node whose virtual signal resulting from the random time delay value is shorter in case third and fourth nodes make an attempt to acquire a channel for a packet communication with the first node, if a signal is not detected in the powerline when a signal detection result of the powerline is checked according to a channel signal resulting from a signal detection of the powerline and a virtual signal resulting from the delay of the channel signal as much as a random time delay value within an initial time delay value range;

(b) performing a packet communication with the first node by letting a channel acquired by either the node that does not acquire a channel or the fifth node, whose virtual signal delayed as much as the random time delay value is shorter in case a node, which has not acquire a channel in step (a), and an additional fifth node simultaneously make an attempt for a packet communication with the first node, according to a channel signal resulting from the signal detection of a powerline after setting a random time delay value of a predetermined range when the node that does not acquire a channel sets a time delay value range at a predetermined one, smaller than a maximum of a prior time delay value and a virtual signal resulting from the delay of the channel signal as much as the set random time delay value, and according to a channel signal resulting from the signal detection of the powerline in the fifth node and a virtual signal resulting from the delay of the channel signal as much as the random time delay value of the initial time delay value range, if a signal is not detected in the powerline when a signal detection result of the powerline is checked;

(c) performing a packet communication with the first node by acquiring a channel if a signal is not detected in the powerline as a result of the signal detection of the powerline according to a channel signal resulting from the signal detection of a powerline after setting a random time delay value of a predetermined range when the node that does not acquire a channel at step (b) sets a time delay value range at a predetermined one, smaller than a maximum of a prior time delay value, and a virtual signal resulting from the delay of the channel signal as much as the set random time delay value.

2. The method, as defined in claim 1, wherein the predetermined range is set at one of the following values, that is, $1/10, 1/9, 1/8, 1/7, 1/6, 1/5, 1/4, 1/3$ or $1/2$ of the maximum value range of the prior time delay value.

3. The method, as defined in claim 1, wherein at step (b), (c), when the packet communication is completed, the time delay value range will be returned to the maximum of the initial time delay value range.

4. A packet communication method of a powerline communication system in which first and second nodes out of all nodes 1 through n that are in connection with a powerline are performing a packet communication, the method comprising the steps of:

(a) performing a packet communication with the first node by letting a channel acquired by either the third or fourth node whose virtual signal resulting from the random time delay value is shorter in case third and fourth nodes make an attempt to acquire a channel for a packet communication with the first node, if a signal is not detected in the powerline when a signal detection result of the powerline is checked according to a channel signal resulting from a signal detection of the powerline and a virtual signal resulting from the delay of the channel signal as much as a random time delay value within an initial time delay value range;

(b) performing a packet communication with the first node by letting a channel acquired by either the node that does not acquire a channel or the other plurality of nodes, whose virtual signal delayed as much as the random time delay value is shorter in case a node which has not acquired a channel in step (a), and an additional plurality of nodes simultaneously make an attempt for a packet communication with the first node, according to a channel signal resulting from the signal detection of a powerline after setting a random time delay value of a predetermined range when the node that does not acquire a channel sets a time delay value range at a predetermined one, smaller than a maximum of a prior time delay value and a virtual signal resulting from the delay of the channel signal as much as the set random time delay value, and according to a channel signal resulting from the signal detection of the powerline in each of the plurality of nodes and a virtual signal resulting from the delay of the channel signal as much as the random time delay value of the initial time delay value range, if a signal is not detected in the powerline when a signal detection result of the powerline is checked;

(c) performing a packet communication with the first node by acquiring a channel after setting a random time delay value of a predetermined range when the node that does not acquire a channel at step (a) or any of the other nodes that do not acquire a channel at step (b) sets a time delay value range at a predetermined one, smaller than a maximum of a prior time delay value, if a signal is not detected in the powerline as a result of the signal detection of the powerline according to a channel signal resulting from the signal detection of a powerline and a virtual signal resulting from the delay of the channel signal as much as the set random time delay value; and (d) repeating step (c) until the packet communication with the first node is completed in the node that does not acquire a channel at step (a) or the additional plurality of nodes that do not acquire a channel.

5. The method, as defined in claim 4, wherein the predetermined range is set at one of the following values, that is, $1/10, 1/9, 1/8, 1/7, 1/6, 1/5, 1/4, 1/3$ or $1/2$ of the maximum value range of the prior time delay value.

6. The method, as defined in claim 4, wherein at step (b), (c), when the packet communication is completed, the time delay value range will be returned to the maximum of the initial time delay value range.

* * * * *